Dec. 8, 1931.  M. C. ARMSTRONG  1,835,451
MOTOR CYCLE SIREN
Filed March 9, 1931  2 Sheets-Sheet 1
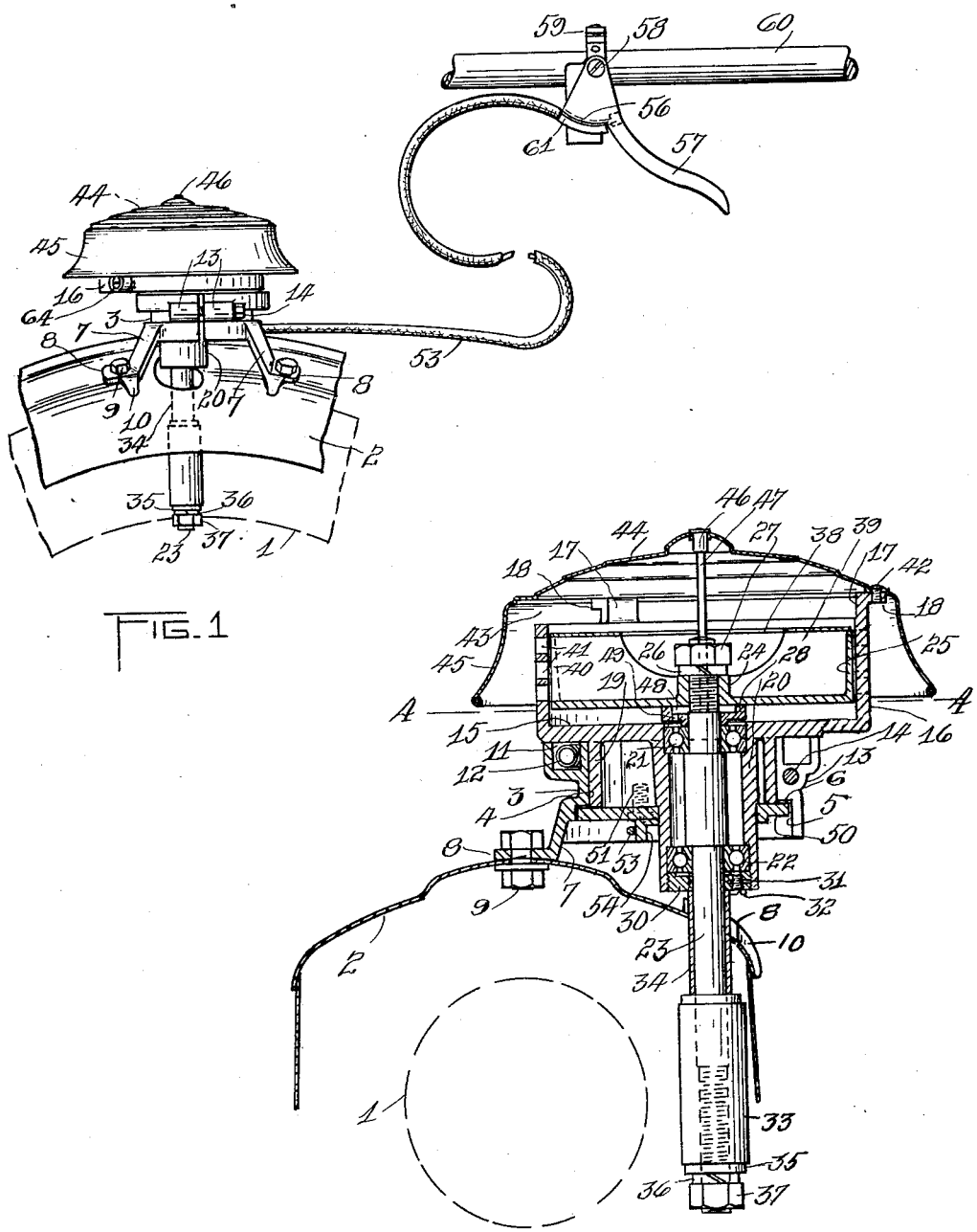
INVENTOR
Merton C. Armstrong
BY
Thorus F. Gurney
his ATTORNEY Dec. 8, 1931.    M. C. ARMSTRONG    1,835,451
MOTOR CYCLE SIREN
Filed March 9, 1931    2 Sheets-Sheet 2
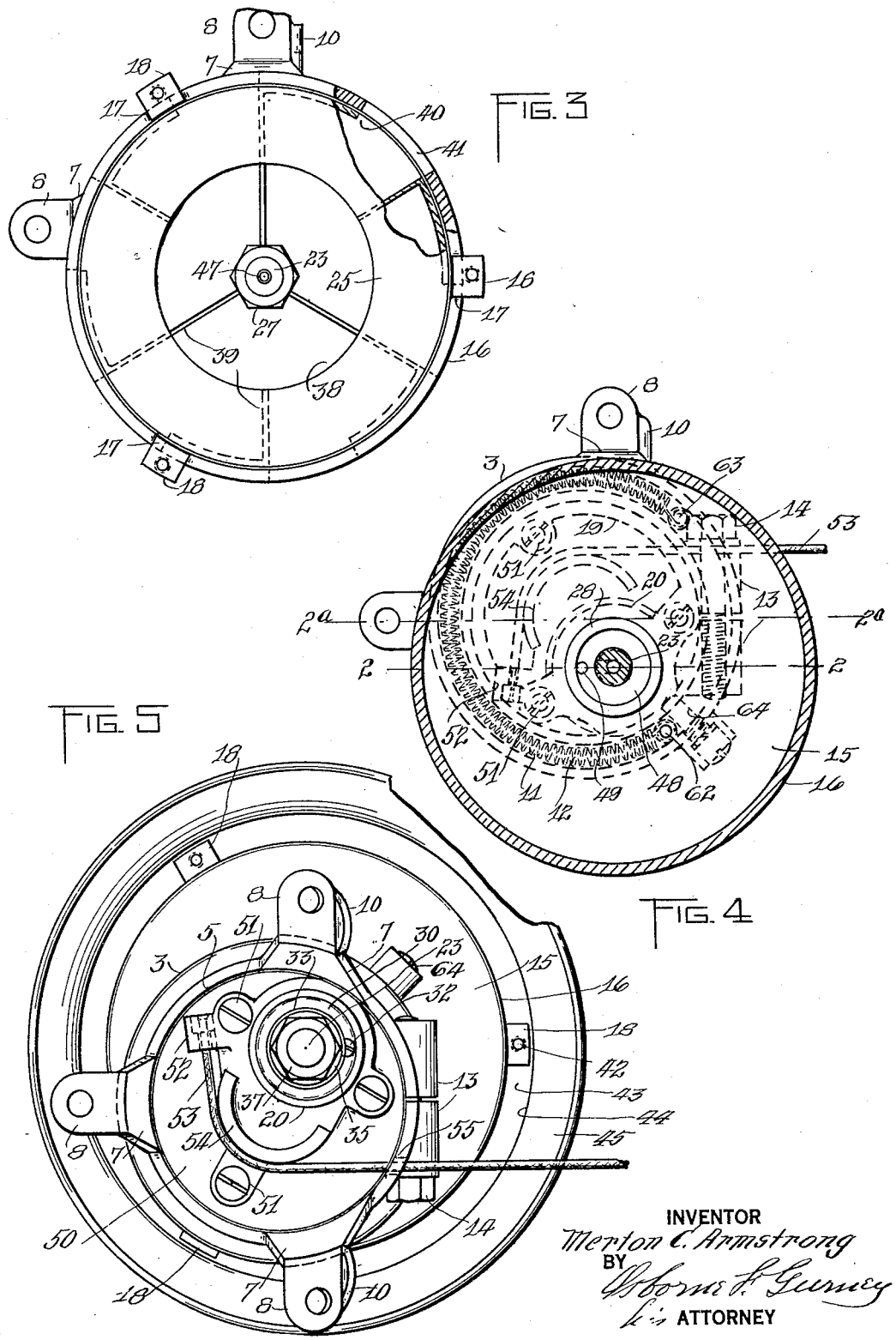

Patented Dec. 8, 1931

1,835,451

UNITED STATES PATENT OFFICE

MERTON C. ARMSTRONG, OF ROCHESTER, NEW YORK, ASSIGNOR TO STERLING SIREN FIRE ALARM COMPANY, INC., OF ROCHESTER, NEW YORK, A CORPORATION OF NEW YORK

MOTOR CYCLE SIREN

Application filed March 9, 1931. Serial No. 521,265.

The present invention relates to the mechanically driven vehicle type of siren, an object thereof being to provide a siren particularly adapted for use on motorcycles and in which the rotor shaft is driven by frictional contact with a revolving element of the vehicle which, in this instance, is one of the tires.

In accomplishing the invention, the siren has been so designed as to be mounted upon one of the wheel fenders with the rotor shaft or spindle extending through an opening in the fender and normally lying in proximity to the tire, another object of the invention being to mount such shaft within an eccentric which is operable to move the shaft into and out of frictional engagement with the tire.

A further object of the invention is to effect rotary movement of the eccentric in one direction by means of a manually operable flexible connection, and in the other direction by spring means of novel arrangement.

A further object of the invention is the provision of a vehicle siren of the character described which is of weatherproof construction.

And, a still further object of the invention is the provision of a motorcycle siren which is attractive in appearance, strong and durable in construction, of few parts, not liable to derangement, and easy to operate.

To these and other ends the invention consists of a siren as will be fully set forth in the following description and particularly defined in the appended claims.

The accompanying drawings illustrating the invention are as follows:

Figure 1 is a view of the siren in side elevation and mounted on the front fender of a motorcycle, the manual control also being shown.

Fig. 2 is a view partly in elevation and partly in vertical section, the rotor together with the housing and hub portions of the stator being shown in section as on line 2—2, Fig. 4, while the casing and the eccentric portion of the stator are shown in section as on line 2ª—2ª, Fig. 4.

Fig. 3 is a top plan view with the hood removed.

Fig. 4 is a sectional view as on line 4—4, Fig. 2.

And, Fig. 5 is a plan view of the siren from the under side.

In the drawings similar reference numerals refer to similar parts throughout the several views.

Indicated at 1, in dotted lines, is the front tire of a motorcycle and 2 is the fender. Supported upon the fender is a casing 3 having a bore 4 and, in its under side, a counterbore 5 forming a shoulder 6, this casing being provided with a three-point bearing comprising legs 7 terminating in feet 8 which by bolts 9 are secured to the fender, two of such legs being formed with downwardly extending ears 10 adapted to engage over a side wall of the fender so as to facilitate the proper positioning of the casing and to give it additional bearing.

In the top of the casing is an upwardly opening annular channel 11 for receiving a coiled compression spring 12, the purpose of which is hereinafter described. The wall of the casing is also split vertically and formed on opposite sides of such opening are bosses 13, a clamping bolt 14 extending through one of such bosses and being threaded into the other.

Supported upon the upper face of the casing 3 is the bottom wall 15, of the cylindrical stator or rotor housing 16 which is open at its upper face and formed with upstanding lugs 17, in the plane of the cylindrical wall, which terminate in laterally turned portions 18. On the under side of the bottom wall 15 is an annular projection 19 eccentrically arranged with respect to the axis of the housing 16 and being rotatable in the bore 4 of the casing 3, the bolt 14 being employed as a take up for wear and thus maintain the desired fitting of the casing about the projection 19 rotatable therein. Within the projection 19 and forming an integral part thereof is a hub 20 having a bore axially of the housing 16, this hub having counterbores at the top and bottom for receiving anti-friction bearings 21 and 22, respectively.

Mounted to run on the bearings 21 and 22 is a shaft 23 which is threaded at its upper end into the hub 24 of the rotor 25 arranged within the housing 16, a lock washer 26 and nut 27 clamping the rotor against a collar 28 interposed between the back or bottom wall of the rotor and the inner race member of the ball bearing 21, such bearing seating against a shoulder on the shaft. The ball bearing 22 is also seated against a shoulder on the shaft and is held in place by a retaining nut 30 threaded into the counterbore therefor in the hub 20, this nut being locked in place, with the engaging threads wedged together, by having a sawcut 31 therein and provided with a binding screw 32.

Threaded onto the lower end of the shaft is a friction sleeve or pulley 33 which is held against axial movement by a sleeve 34 interposed between the upper end of such friction member and the inner race member of the bearing 22, and by a collar 35, lock washer 36 and nut 37 on the threaded lower end of the shaft.

The fan or rotor 25 is of the usual construction, air being taken in through an axial opening 38 in an end face which, in this instance, is the upper face, and discharged by radial blades 39 through radial openings 40 in the peripheral wall, there being a plurality of annular series of such openings. These openings 40 register with like openings 41 in the housing 16, the siren sound being created by the rapid alternate opening and closing of the openings 41 by the rotor.

Supported upon and secured by screws 42 to the flange portions 18 of the lugs 17 in spaced relation to the top of the housing 16 so as to provide an air intake 43, is a hood 44 formed with a downwardly opening flaring mouth projector 45, this combined hood and projector functioning as a protector for the rotor and means for intensifying and directing the sound waves. An oil cup 46 in the top of the hood 44 has communication through an oil pipe 47 with an axially extending bore in the shaft 23, the bottom of this opening communicating through a lateral opening with a chamber 48 in the washer 28, such chamber having an opening 49 through which the oil is fed to the bearings 21 and 22.

Seated in the counterbore 5 and abutting the shoulders 6 is a plate 50 for holding the casing 3 and stator 16 against relative axial movement, the plate being secured to the cylindrical projection 19 by means of screws 51. On the under face of the plate is a lug 52 to which one end of an armored flexible cable 53 is attached, this cable passing over and in contact with the peripheral surface of a segmental projection 54 on the plate, thence through an opening 55 in the casing 3 and having its other end passing over the peripheral surface of the segmental portion 56 of a hand operated lever 57 pivoted at 58 to a bracket 59 mounted on the handle bar 60, the outer end of the cable being attached to the lever and guided in a channel therefor by an overhanging portion 61 of the bracket.

The coiled spring 12 seated in the channel 11 of the casing 3 is anchored at one end to a stud 62 threaded into the bottom 15 of the stator, and at its other end to a like stud 63 threaded into the bottom of the channel, with the stud 62 normally engaging a stud 64 threaded radially into the casing 3.

Operation of the siren is as follows:

Pressing the hand lever 57 toward the handle bar 60 effects a pull on the cable 53 and a consequent rotary movement of the stator 16 and parts carried thereby in the direction of the arrow, Fig. 4, such movement causing compression of the spring 12 and travel of the stud 62 away from the stop 64. The shaft 23 being eccentrically arranged within the stator member 19 is thus swung so that the friction sleeve 33 is brought into yielding contact with the tire 1 and thereby, with the shaft and rotor, caused to rotate at a relatively high speed. When tension on the cable 53 is released by releasing the hand lever 57, the spring 12 effects a reverse rotary movement of the eccentric to swing the friction member 33 out of engagement with the tire, this movement being limited by the stud 62 engaging the stop 64.

From the foregoing, it will be observed that there has been provided a siren adapted to be mounted on the fender of a vehicle, such as a motorcycle, that the rotor is driven by frictional contact of the shaft held yieldingly against the tire; that such shaft is eccentrically mounted so as to be swung into engagement with the tire through a rotary movement of the stator; that this stator movement is effected by a cable controlled manually from any suitable place, as by a lever mounted on the handle bar; that spring means are provided for swinging the shaft out of engagement with the tire; that a novel arrangement has been provided whereby the cable secures a good leverage in its operative pull; that the rotor is mounted to run on anti-friction bearings for which a simple and effective oiling system is provided; and, that the casing 3 with the hood 44 provide a weather-proof housing.

What I claim is:

1. The combination, with a fixed member and a revolving element, of a siren comprising a shaft, a rotor carried by said shaft, a stator surrounding said rotor and having a hub in which said shaft is revolubly mounted, a support carried by said fixed member having an annular bearing spaced from and surrounding said hub and in which said stator is eccentrically mounted, a friction member on said shaft, means for effecting rotary movement of the stator in one direction to swing said friction member into contact with said revolving element, and additional means for effecting a reverse movement of the stator to swing the friction member out of contact with the revolving element.

2. The combination, with a fixed member and a revolving element, of a siren comprising a shaft, a rotor carried by said shaft, a stator surrounding said rotor and in which said shaft is revolubly mounted, a support carried by said fixed member and having an annular bearing surrounding the shaft in spaced relation thereto, said stator having an eccentrically mounted extension rotatably received in said bearing, a friction member on said shaft, a manually controlled flexible cable for effecting rotary movement of the stator in one direction to swing said friction member into contact with said revolving element, and spring means for effecting a reverse movement of the stator to swing the friction member out of contact with the revolving element.

3. The combination, with a fixed member and a revolving element, of a siren comprising a casing carried by said fixed member, a shaft, a rotor fixed to said shaft, a stator surrounding the rotor and in which said shaft is revolubly mounted, said stator having an eccentrically mounted projection rotatably received in said casing and surrounding said shaft in spaced relation thereto, a friction member on said shaft, a coiled spring anchored at one end to said stator and at the other end to said casing, and a manually operable cable attached to said stator for effecting a rotary movement thereof against the action of said spring and to swing said friction member into yielding contact with said revolving element.

4. The combination, with a fixed member and a revolving element, of a siren comprising a casing carried by said fixed member, said casing having a bore and a channel concentric with and surrounding the bore, a shaft, a rotor carried by said shaft, a stator surrounding said rotor, a hub on said stator projecting through the said bore and in which said shaft is revolubly mounted, an eccentric formed on said stator, such eccentric surrounding said hub, a coiled spring arranged within the said channel and anchored at one end to said stator and at its other end to said casing, manually operable means for effecting rotary movement of said stator against the action of said spring to swing said friction member into yielding contact with said revolving element, and a stop against which the stator is normally held by the action of said spring.

5. A combination and siren construction in accordance with claim 4 characterized by the wall of said casing being split and including a take up bolt in the casing substantially as and for the purpose set forth.

6. In a vehicle siren, the combination with a tire and a fender over the tire having an opening therethrough, of a casing supported upon said fender, a shaft extending through said opening, a rotor carried by said shaft, a stator including a housing for the rotor having a bottom wall, an eccentric projecting from said wall and rotatable within the casing, and a hub projecting through said eccentric and in which said shaft is revolubly mounted, means carried by said stator and co-operating with said casing to hold the stator against axial movement, a manually operable cable attached to said means for effecting rotary movement of the stator in one direction to swing said friction member into contact with said tire and a coiled compression spring arranged between the said stator wall and said casing operating against the action of said cable.

7. A vehicle siren in accordance with claim 6 characterized by said supporting member including legs and feet on the legs conformed to the curvation of said fender.

8. A vehicle siren in accordance with claim 6 characterized by said means for holding the stator against axial movement being a plate secured to said eccentric and including a projection on the under face thereof having a segmental surface about which said cable engages.

9. In a siren of the character described, a shaft, a rotor fixed to the shaft and having an axial opening in its outer face for the intake of air and radial openings for discharge of the air, a stator surrounding the rotor and having radial openings registering with those of the rotor, such stator being open at its outer end, an inverted hood supported above and in spaced relation to the open end of the stator and including a skirt portion spaced from and surrounding the stator to afford combined intake and outlet passages for the air drawn into and expelled from the stator by the rotor, a hub on said stator in which said shaft is revolubly supported, a support for the stator and means for moving the stator in a manner to effect a swinging of said shaft for the purpose set forth.

10. In a siren, the combination of a shaft arranged at an angle to the horizontal, means for driving the shaft, a rotor fixed to the shaft, a stator surrounding the rotor, the rotor and stator each having an end wall, a ball bearing seated in said stator and on which said shaft is mounted, a hood supported above the stator, an oil cup in said hood, said shaft having an axial bore and a lateral bore communicating with the axial bore, an oil pipe leading from said cup to said axial bore, and a collar interposed between the inner race member of said bearing and said end wall of the rotor, such collar having a chamber into which said lateral bore discharges and an opening therefrom onto said bearing.

11. A motorcycle siren comprising in combination with a tire and a fender over the tire, a shaft, a rotor fixed to the shaft, such rotor having an axial opening in its outer face for the intake of air and radial openings in its peripheral wall for the discharge of air, a stator including an outwardly opening cylindrical wall surrounding the rotor, a hub in which said shaft is revolubly mounted and an eccentric surrounding said hub, a casing in which said eccentric is mounted for rotary movement, a plate secured to the bottom of said eccentric and engaging a shoulder on said casing to hold the stator against axial movement, legs formed on said casing, feet carried by said legs and secured to said fender, such feet being conformed to the curvature of the fender, a friction member carried by said shaft, a manually controlled cable attached at one end to the under side of said plate, a projection on said plate having a segmental surface over which said cable engages, a pull on said cable effecting rotary movement of said stator to swing said friction member into contact with said tire, a coiled spring partly surrounding said eccentric and housed within said casing, such spring having one end anchored to the stator and the other end to the casing and being placed under tension by an operative pull on said cable, and a hood carried by said stator and in spaced relation to the peripheral wall thereof to provide an opening for the intake of air to said rotor.

12. In combination, a fixed member and a rotary driving element, of a siren comprising a support on said fixed member having an annular bearing, a stator having an eccentrically arranged extension rotatably received in said bearing, a shaft projecting through said extension and rotatably supported by said stator and having a portion arranged when the stator is rotated to a predetermined position to be operated by said rotary driving element, a rotor disposed on said shaft within the stator, and means for rotating said stator within said bearing to said predetermined position.

13. In combination, a fixed member and a rotary driving element, of a siren comprising a support on said fixed member having an annular bearing, a stator having an eccentrically arranged extension rotatably received in said bearing, a shaft projecting through said extension and rotatably supported by said stator and having a portion arranged when the stator is rotated to a predetermined position to be operated by said driving element, a rotor disposed on said shaft within the stator, a segment carried by said extension and offset relative to the axis of said bearing, a cable for rotating said stator in one direction having an end portion extending about said segment and connected with the extension, and a spring for returning the stator to normal position having one end connected therewith and the other connected with said bearing.

14. In combination, a fixed member and a rotary driving element, of a siren comprising a support on said fixed member having an annular bearing, a stator having an eccentrically arranged extension rotatably received in said bearing, a shaft projecting through said extension and rotatably supported by said stator and having a portion arranged when the stator is rotated to a predetermined position to be operated by said rotary driving element, a rotor disposed on said shaft within the stator, an inverted hood supported by and extending downwardly around the stator in spaced relation thereto to form a passageway for the air drawn into and expelled from the stator by the rotor, an oil cup connected with said hood, means connecting the oil cup with said shaft bearing, and means for rotating said stator within said bearing to said predetermined position.

15. In combination, a fixed member and a rotary driving element, of a siren comprising a support on said fixed member having an annular bearing, a stator having an eccentrically arranged extension rotatably received in said bearing, a shaft projecting through said extension and journaled in a bearing carried by the stator, said shaft having a portion arranged when the stator is rotated to a predetermined position to be operated by said rotary driving element whereby to rotate the shaft, a rotor disposed on said shaft within the stator, an inverted hood carried by the stator, means for rotating the stator to and from said predetermined position, an oil holding receptacle on the hood, and means connected with the receptacle arranged to deliver the oil to said shaft bearing.

MERTON C. ARMSTRONG.